Nov. 3, 1970 R. S. HUGHES 3,538,346

GATED THRESHOLD AMPLIFIER

Filed Nov. 3, 1967 2 Sheets-Sheet 1

INVENTOR.
Richard Smith Hughes
BY
Roy Miller
ATTORNEY

INVENTOR.
Richard Smith Hughes
BY
Roy Miller
ATTORNEY

United States Patent Office 3,538,346

Patented Nov. 3, 1970

3,538,346
GATED THRESHOLD AMPLIFIER

Richard Smith Hughes, China Lake, Calif., assignor to the United States of America as represented by the Secretary of the Navy Filed Nov. 3, 1967, Ser. No. 680,436
Int. Cl. H03k 3/26, 5/20
U.S. Cl. 307—235 2 Claims

ABSTRACT OF THE DISCLOSURE

A variable gain amplifier connected in series with a gated monostable multivibrator, wherein the multivibrator will operate to change states only if a gating circuit is properly biased and the output of the amplifier exceeds the trigger level of the multivibrator.

BACKGROUND OF THE INVENTION

In many situations it is desirable to detect a predetermined input dependent upon an external gating function. To accomplish this, it has been the general practice to place an amplifier in series with a monostable multivibrator; shunt the output of the multivibrator with a gating function and connect the combination to an AND gate so that there is an output only when the gating function and the output of the multivibrator coincidentally appear at the input to the AND gate.

A problem with the prior art is that the propagation delay is on the order of 100 nanoseconds. Also, the devices are bulky and weighty.

SUMMARY OF THE INVENTION

In accordance with the present invention an amplifier is placed in series with a monostable multivibrator. The multivibrator will not operate unless enabled by a gating function. Thus, when the gating function is turned off, the output of the multivibrator will be zero. When the gating function is set to enable the multivibrator to operate when triggered by the amplifier, the output of said multivibrator will be a pulse of duration in accordance with the time constant of the multivibrator. Propagation delay of the invention is on the order of 50 nanoseconds.

DESCRIPTION OF THE PREFERRED EMBODIMENTS

Figures 1, 2, 3:
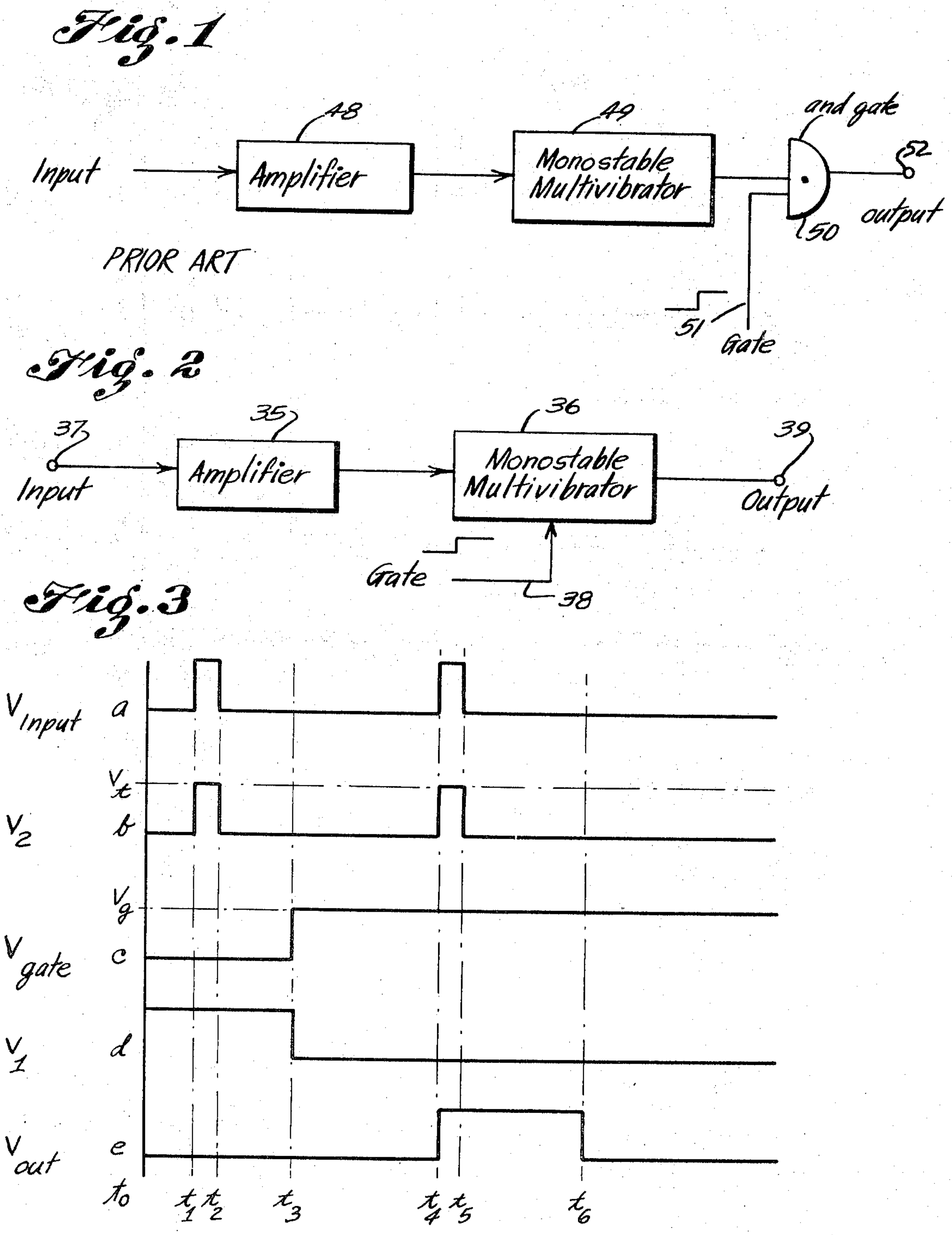
FIG. 1 is a block diagram of the prior art.
FIG. 2 is a block diagram of the invention.
FIG. 3 is a family of curves identifying the waveforms at different nodes of the circuit of FIG. 2.

FIG. 1 is a block diagram of the prior apparatus for accomplishing the detection of a predetermined input when said input is dependent upon an external gating function. An amplifier 48 is placed in series with monostable multivibrator 49. The output of multivibrator 49 is shunted with gating function 51 and the combination connected to AND gate 50. There can be an output 52 only when gating function 51 and the output from multivibrator 49 appear coincidentally at the input to AND gate 50.

FIG. 2 is a block diagram of the preferred embodiment of the present invention. A pulse coupled to input 37 is amplified by a variable gain amplifier 35. The output of amplifier 35 is fed into a monostable multivibrator 36. Gating function 38 enables the monostable multivibrator 36 to trigger if the output from amplifier 35 is large enough. If there is no gating voltage 38 the multivibrator will be disabled, thus even a very high amplifier output will not trigger the monostable multivibrator. The circuit is arranged so that when there is no input to monostable multivibrator 36 the introduction or removal of gating voltage 38 will not produce an output at output terminal 39.

Figure 4:
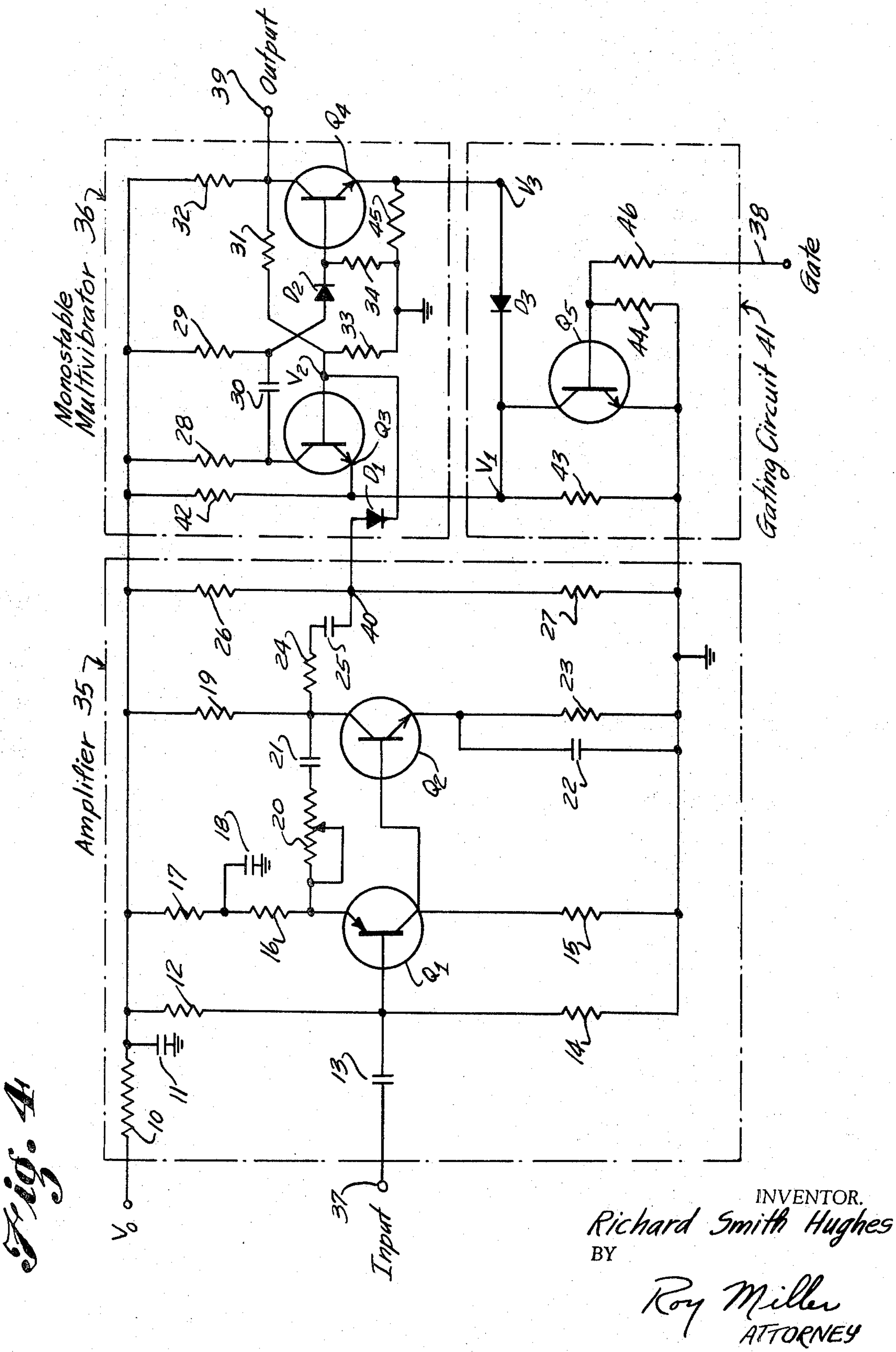
FIG. 4 is a schematic diagram of the invention.

The operation of the embodiment shown in FIG. 2 may be illustrated by the waveforms of FIG. 3 and the schematic diagram of FIG. 4. During the time interval $t_0$–$t_1$ the amplifier 35 is quiescent. The output from amplifier 35, which is represented by voltage $V_2$ of FIG. 3*b* is equal to zero, as are the input voltage of FIG. 3*a*, the gating voltage of FIG. 3*c* and the output voltage of FIG. 3*e*. FIG. 3*d* illustrates a voltage at some potential $V_1$ which will disable the monostable multivibrator 36. During the period $t_1$–$t_2$ an input pulse causes the output $V_2$ of the amplifier 35 to rise to potential $V_t$ which is equal to the threshold voltage needed to trigger the monostable multivibrator 36. Since there is no gating voltage 38, transistor $Q_5$ is turned off and the emitter voltage of transistor $Q_3$ is held at potential $V_1$. Voltage $V_1$ is frrozen so that it is higher than $V_t$, the threshold voltage needed to trigger monostable multivibrator 36. So long as $V_2$ does not exceed $V_1$, transistor $Q_3$ cannot cause the cycle of the monostable multivibrator to begin. At time $t_3$ the gating voltage is raised to $V_g$. This causes transistor $Q_5$ to saturate and $V_1$ drops to zero. When a second pulse of magnitude $V_t$ occurs at time $t_4$ voltage $V_2$ is now greater than $V_1$ and monostable multivibrator 36 will operate through one cycle, turning off at time $t_6$. The duration of the pulse at output terminal 39 may be adjusted by changing the time constant of resistor 29 and capacitor 30. Thus there can be output up to time $t_6$ even through the input voltage ceases at time $t_5$.

Consider the situation when there is a gating voltage 38, $V_1$ equals zero, there is no input at input 38 and $V_2$ also equals zero. In this quiescent condition transistor $Q_4$ is saturated, output 39 is effectively zero and the base to emitter junction of $Q_4$ is essentially a short circuit. When gating voltage 38 is removed, potential $V_1$ changes from zero to some higher potential. If diode $D_3$ were not in the circuit, transient currents would cause transistor $Q_4$ to change states creating some regenerative action in the circuit thus affecting output 39. With diode $D_3$ in the circuit, potential $V_3$ is greater than $V_1$ so long as there is gating voltage 38. When gating voltage 38 is removed $V_1$ rises until diode $D_3$ becomes back biased. As $V_1$ rises, potential $V_3$ does not change thus transistor $Q_4$ will not shift out of its quiescent state and output 39 will remain essentially zero.

By way of illustration only, a gated threshold amplifier as illustrated in FIG. 4 may have the following component values:

$V_0$=+12 volts

Resistor 10—51Ω
Capacitor 11—15 μfarad
Resistor 12—10KΩ
Capacitor 13—1 farad
Resistor 14—10KΩ
Resistor 15—2KΩ
Resistor 16—100Ω
Resistor 17—2KΩ
Capacitor 18—1 μfarad
Resistor 19—2KΩ
Variable resistor 20—2KΩ
Capacitor 21—1 farad
Capacitor 22—1 μfarad
Resistor 23—2KΩ
Resistor 24—200Ω
Coupling capacitor 25—200 picofarad
Resistor 26—12KΩ
Resistor 27—3KΩ
Resistor 28—2KΩ
Resistor 29—15KΩ

Capacitor 30—.001 μfarad
Output resistor 31—5KΩ
Resistor 32—2KΩ
Resistor 33—1KΩ
Resistor 34—5KΩ
Resistor 42—5KΩ
Resistor 43—1KΩ
Resistor 44—2KΩ
Resistor 45—51Ω
Resistor 46—10K
Transistor $Q_1$—2N2412
Transistors $Q_2$ through $Q_5$—2N744
Diodes $D_1$ through $D_3$—1N3064

While there have been shown and described and pointed out the fundamental novel features of the invention as applied to a preferred embodiment, it will be understood that various omissions and substitutions and changes in operation may be made by those skilled in the art without departing from the spirit of the invention. It is the intention therefore, to be limited only as indicated by the scope of the following claims.

The invention described herein may be manufactured and used by or for the Government of the United States of America for governmental purposes without the payment of any royalties thereon or therefor.

What is claimed is:

1. An apparatus for detecting a predetermined input level and triggering a monostable multivibrator, the ability to trigger dependent upon whether said monostable multivibrator is enabled or disabled by a gating voltage, said apparatus comprising:

a variable gain amplifier having an output;

a monostable multivibrator having inputs;

said monostable multivibrator having a first and a second transistor, each having an emitter, a collector, and a base;

the output of said variable gain amplifier being coupled to an input of said monostable multivibrator;

a gating circuit having an output coupled to another input of said multivibrator;

said gating circuit being a switch which grounds the emitter of said first transistor of said multivibrator to enable the apparatus; and said monostable multivibrator being arranged so that said monostable multivibrator will change states when a pulse of a predetermined magnitude is coupled from said amplifier to said monostable multivibrator and said monostable multivibrator is enabled by the presence of an output from said gating circuit.

2. The apparatus of claim 1 wherein:

said gating circuit has a transistor with an emitter, collector, and base; and a diode is connected from the emitter of said second transistor of said multivibrator to the emitter of said first transistor of said multivibrator so that said diode prevents said second transistor from changing states when a disabling voltage is placed on the base of said gating circuit transistor.

References Cited

UNITED STATES PATENTS 2,986,649 5/1961 Wray ---------- 307—273 XR

DONALD D. FORRER, Primary Examiner

J. ZAZWORSKY, Assistant Examiner

U.S. Cl. X.R.

307—273; 328—196, 207